US012618462B2

(12) United States Patent
Fujimoto et al.

(10) Patent No.:  US 12,618,462 B2
(45) Date of Patent:      May 5, 2026

(54) MOTORCYCLE

(71) Applicant: HONDA MOTOR CO., LTD., Tokyo (JP)

(72) Inventors: Yasushi Fujimoto, Tokyo (JP); Yoshiaki Tsukada, Tokyo (JP); Takashi Ozeki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/850,950

(22) PCT Filed: Jan. 24, 2023

(86) PCT No.: PCT/JP2023/002015

§ 371 (c)(1),
(2) Date: Sep. 25, 2024

(87) PCT Pub. No.: WO2023/188739

PCT Pub. Date: Oct. 5, 2023

(65) Prior Publication Data

US 2025/0327515 A1      Oct. 23, 2025

(30) Foreign Application Priority Data

Mar. 30, 2022      (JP) ................................. 2022-057690

(51) Int. Cl.
F16H 57/04      (2010.01)
B60K 1/00      (2006.01)

(52) U.S. Cl.
CPC ............. F16H 57/043 (2013.01); B60K 1/00 (2013.01); F16H 57/0473 (2013.01); B60K 2001/003 (2013.01); B60Y 2200/12 (2013.01)

(58) Field of Classification Search
CPC .... F16H 57/04; F16H 57/043; F16H 57/0476; B60K 1/00
See application file for complete search history.

(56) References Cited

U.S. PATENT DOCUMENTS 5,121,720 A  *   6/1992  Roberts .................... F01M 5/00
                                                        184/6.3
5,195,476 A  *   3/1993  Schwarz ................. F02N 11/08
                                                        123/179.5

(Continued)

FOREIGN PATENT DOCUMENTS

CN          202578923 U  * 12/2012
CN          112594372 A     4/2021

(Continued)

OTHER PUBLICATIONS

International Search Report Corresponding to International Application No. PCT/JP2023/002015, dated Apr. 11, 2023, 4 pages.

(Continued)

*Primary Examiner* — Michael A Riegelman

(74) *Attorney, Agent, or Firm* — Rankin, Hill & Clark LLP

(57)      ABSTRACT

A motorcycle that inhibits damage to a transmission and a clutch. The motorcycle includes: a drive motor; a transmission; a clutch that connects or disconnects power transmission between the transmission and the drive motor; a mechanical oil pump that is driven by the drive motor to supply a coolant to the drive motor and the transmission; and a control portion that drives the drive motor to supply the coolant to the drive motor and the transmission if an accelerator operation is not detected and a neutral state is detected, or if an accelerator operation is not detected and a disconnected state of the clutch is detected.

1 Claim, 6 Drawing Sheets

(56) References Cited

U.S. PATENT DOCUMENTS

| | | | | | |
|---|---|---|---|---|---|
| 6,029,621 | A | * | 2/2000 | Berels ................... | F01M 5/025 |
| | | | | | 123/196 S |
| 6,655,342 | B1 | * | 12/2003 | Wendels ............... | F01M 5/025 |
| | | | | | 123/196 R |
| 7,334,557 | B2 | * | 2/2008 | Callan ................... | F01M 1/18 |
| | | | | | 123/196 S |
| 9,470,123 | B2 | * | 10/2016 | Lyons ................... | F01M 5/025 |
| 10,371,254 | B2 | * | 8/2019 | Fukui ................. | F16H 57/0439 |
| 2006/0102133 | A1 | * | 5/2006 | Callan ................... | F01M 1/18 |
| | | | | | 123/196 R |
| 2008/0121464 | A1 | * | 5/2008 | Ledger ................. | B60K 6/445 |
| | | | | | 184/6.13 |
| 2010/0299045 | A1 | * | 11/2010 | Moriya ................. | F02D 17/00 |
| | | | | | 701/102 |
| 2011/0174250 | A1 | * | 7/2011 | Borde ................. | F01L 1/2422 |
| | | | | | 123/196 R |
| 2015/0057858 | A1 | * | 2/2015 | Nitta ................. | F16H 57/0439 |
| | | | | | 701/22 |
| 2016/0369853 | A1 | * | 12/2016 | Sugiura ................... | F01M 1/10 |
| 2025/0327515 | A1 | * | 10/2025 | Fujimoto ............... | B60K 1/00 |

FOREIGN PATENT DOCUMENTS

| | | | | | | |
|---|---|---|---|---|---|---|
| CN | 117418917 | A | * | 1/2024 | ............. | F01M 5/025 |
| JP | H07-315059 | A | | 12/1995 | | |
| JP | H09-286245 | A | | 11/1997 | | |
| JP | 2003-180005 | A | | 6/2003 | | |
| JP | 4333759 | B2 | * | 9/2009 | ............. | B60K 6/365 |
| JP | 2002-340168 | A | | 11/2022 | | |
| WO | 2013/093986 | A1 | | 6/2013 | | |
| WO | WO-2023126847 | A1 | * | 7/2023 | .............. | B60K 6/48 |

OTHER PUBLICATIONS

International Preliminary Report on Patentability Corresponding to International Application No. PCT/JP2023/002015, Apr. 23, 2024, 9 pages.
English translation of the International Preliminary Report on Patentability dated Oct. 3, 2024 issued in corresponding International application No. PCT/JP2023/002015 (4 pages).

* cited by examiner

MOTORCYCLE

TECHNICAL FIELD

The present invention relates to a motorcycle.

BACKGROUND ART

Technologies for preventing a delay in supplying oil to a transmission caused when a vehicle starts traveling are conventionally known.

For example, Patent Literature 1 discloses a hydraulic control apparatus for a hybrid vehicle equipped with an engine and an electric motor as power sources, where the hydraulic control apparatus starts an oil pump to supply oil to a transmission before power is transmitted from the power source to the transmission.

CITATION LIST

Patent Literature

[Patent Literature 1]
Japanese Patent Laid-Open No. 9-286245

SUMMARY OF INVENTION

Technical Problem

In motorcycles, it is common to use a drive motor to drive an oil pump instead of using an electric oil pump for cost reduction and size reduction. Thus, a structure that inhibits damage to the transmission and the like is desired also for motorcycles that do not have the electric oil pump.

The present invention has been achieved in view of the situation described above and has an object of inhibiting damage to a transmission and a clutch.

Solution to Problem

Japanese Patent Application No. 2022-057690 filed on Mar. 30, 2022, is incorporated herein.

The present disclosure is a motorcycle including: a drive motor; a transmission; a clutch that connects or disconnects power transmission between the transmission and the drive motor; a mechanical oil pump that is driven by the drive motor to supply a coolant to the drive motor and the transmission; a first sensor that detects whether a gear position of the transmission is in a neutral state; a second sensor that detects a connect/disconnect state of the clutch; a third sensor that detects an accelerator operation; and a control portion that drives the drive motor to supply the coolant to the drive motor and the transmission if an accelerator operation is not detected by the third sensor and the neutral state is detected by the first sensor, or if an accelerator operation is not detected by the third sensor and a disconnected state of the clutch is detected by the second sensor.

Advantageous Effects of Invention

In accordance with the present disclosure, a lack of oil can be inhibited in a drive motor and a transmission, and thereby the durability of the drive motor and the transmission can be improved.

DESCRIPTION OF EMBODIMENT

Figure 1:
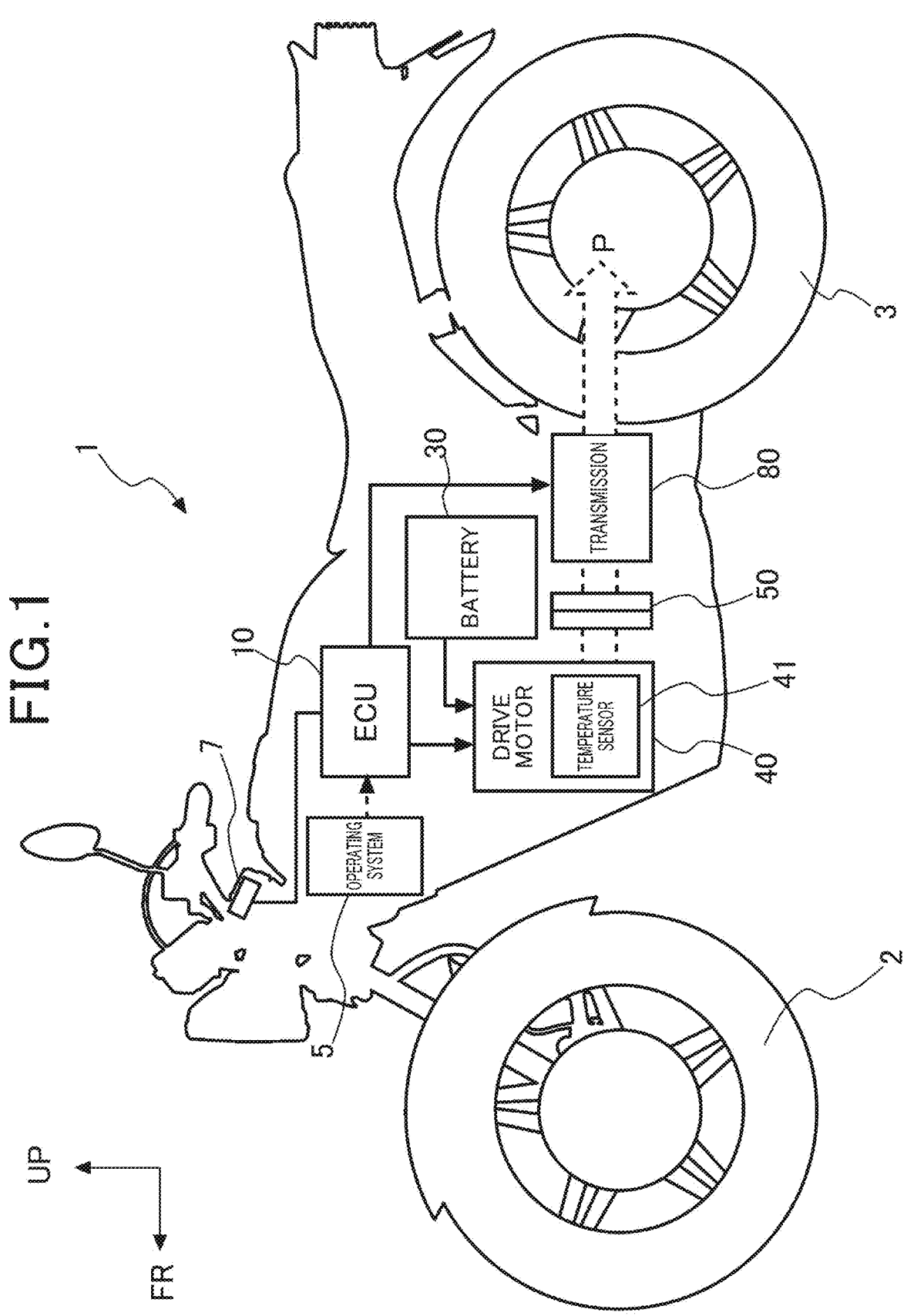
FIG. 1 is a side view of a motorcycle.

An embodiment of the present invention is described below with reference to the drawings. Directions that appear herein, including front, rear, left, and right, are the same as the directions of a vehicle described below, unless otherwise specified. An arrow FR and an arrow UP showing front of the vehicle and top of the vehicle, respectively appear in the drawings used for the following description.

FIG. 1 is a diagram showing a left side of a motorcycle 1. The motorcycle 1 of the present embodiment is an electric motorcycle including a motor as a power unit. The motorcycle 1 includes an operating system 5 that includes a throttle grip, a clutch lever, and a change pedal and the like. The motorcycle 1 includes a display portion 7 for displaying information for a rider. The motorcycle 1 includes a front wheel 2, which is a steering control wheel, and a rear wheel 3, which is a driving wheel. The rear wheel 3 is supported to a rear portion of a swing arm that is supported swingably to a vehicle body frame. The vehicle body frame and the swing arm are not shown.

The motorcycle 1 includes: an ECU (Electronic Control Unit) 10, which is a control unit for performing various types of control; a drive motor 40 for generating driving power; and a battery 30 for supplying electric power to the drive motor 40 and the like. The drive motor 40 includes a temperature sensor 41 for measuring a temperature of the drive motor 40. The temperature sensor 41 corresponds to a fourth sensor. The motorcycle 1 includes a clutch 50 and a transmission 80 to transmit driving power P of the drive motor 40 to the rear wheel 3. The drive motor 40 and the transmission 80 are controlled by the ECU 10, which performs control in conformity to an instruction given by the rider to the operating system 5.

Figure 2:
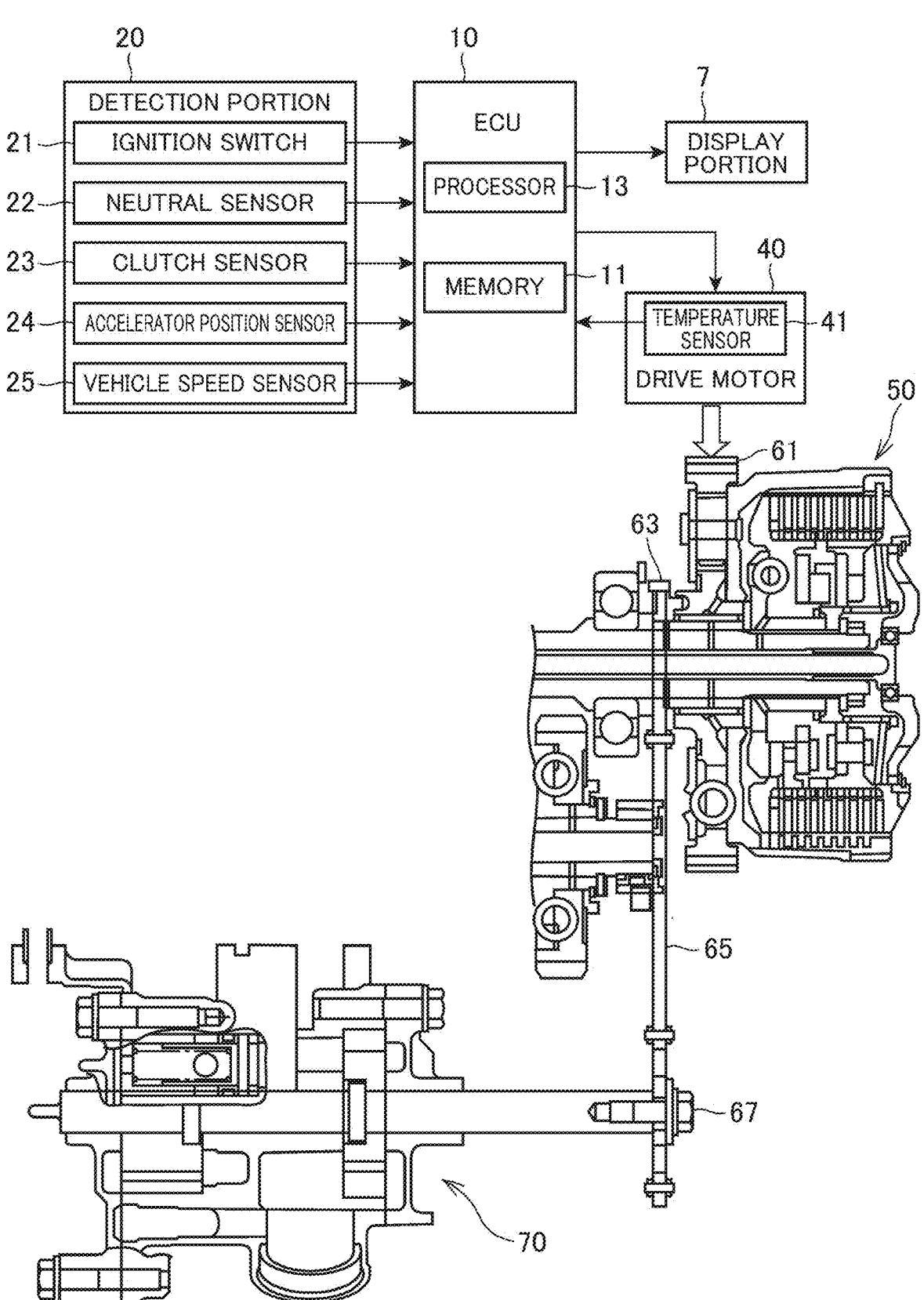
FIG. 2 is a diagram showing a configuration of an ECU and a configuration for operating an oil pump.

FIG. 2 is a diagram showing a configuration of the ECU 10 and a configuration in which a mechanical oil pump 70 is driven by the drive motor 40.

The ECU 10 is a computer device that includes a memory 11 and a processor 13.

The memory 11 includes a nonvolatile storage device, such as a ROM (Read Only Memory), and a volatile storage device, such as a RAM (Random Access Memory). The nonvolatile storage device stores a control program for execution by the processor 13. The volatile storage device is used as an operation area for the processor 13.

The processor 13 is configured by using a CPU (Central Processing Unit) or an MPU (Micro-Processing Unit) and the like. The processor 13 may be configured by using a single processor or a plurality of processors. The processor 13 may be configured by using an SoC in which part or all of the memory 11 and other circuits are integrated. The processor 13 may be configured by combining a CPU for executing a program and a DSP (Digital Signal Processor) for executing predetermined processing. Furthermore, all the functions of the processor 13 may be implemented in hardware, where a programmable device may be used.

A configuration is described below in which the mechanical oil pump 70 is driven by the drive motor 40 when the clutch 50 is in a disconnected state or a gear position of the transmission 80 is in a neutral state.

When the clutch 50 is in the disconnected state, or the gear position of the transmission 80 is in the neutral state, the driving power of the drive motor 40 is transmitted to a drive sprocket 63 via a primary driven gear 61. As the drive sprocket 63 is rotated by the driving power of the drive motor 40, a chain 65 being looped on the drive sprocket 63 is rotated. The chain 65 is also looped on a driven sprocket 67, so that the rotation of the chain 65 rotates the driven sprocket 67, driving the mechanical oil pump 70.

A detection portion 20 is described below.

The detection portion 20 includes an ignition switch 21, a neutral sensor 22, a clutch sensor 23, an accelerator position sensor 24, and a vehicle speed sensor 25. The switch and sensors included in the detection portion 20 are connected to the ECU 10. The neutral sensor 22 corresponds to a first sensor. The clutch sensor 23 corresponds to a second sensor. The accelerator position sensor 24 corresponds to a third sensor.

The ignition switch 21 is operated by the rider to switch the state of power supply to each portion of the motorcycle 1 in association with the start and stop of the drive motor 40.

The neutral sensor 22 detects the neutral state of the transmission 80 and outputs to the ECU 10 a sensor signal indicating that the transmission 80 is in the neutral state.

The clutch sensor 23 detects whether the clutch 50 is in the disconnected state or in a connected state and outputs to the ECU 10 a sensor signal indicative of the detected state of the clutch 50.

The accelerator position sensor 24 measures accelerator opening (an amount of rotation of a right grip) achieved by an operation of the rider and outputs to the ECU 10 the measured opening in the form of a sensor signal.

The vehicle speed sensor 25 detects a vehicle speed of the motorcycle 1 and outputs to the ECU 10 a sensor signal indicative of the detected vehicle speed.

The ECU 10 is also connected to the display portion 7. The display portion 7 includes a display panel, such as a liquid crystal panel. The display portion 7 corresponds to a notification portion.

For example, when the ignition switch 21 is turned ON, the ECU 10 drives the drive motor 40 and causes the display portion 7 to show that the drive motor 40 is being driven.

Furthermore, if the motorcycle 1 is stationary and the temperature of the drive motor 40 is equal to or greater than a set temperature, the ECU 10 causes the display portion 7 to display operation guidance. For example, the operation guidance instructs to bring the gear position of the transmission 80 into the neutral state if the transmission 80 is not in the neutral state. In another example, the operation guidance instructs to bring the clutch 50 into the disconnected state if the clutch 50 is not in the disconnected state.

The ECU 10 drives the drive motor 40 to thereby supply oil to the drive motor 40 and the transmission 80, if any of a first drive condition to a fifth drive condition described below is satisfied.

The first drive condition is that an accelerator operation is not detected by the accelerator position sensor 24 and the neutral state of the transmission 80 is detected based on a sensor signal of the neutral sensor 22.

The second drive condition is that an accelerator operation is not detected by the accelerator position sensor 24 and the disconnected state of the clutch 50 is detected by the clutch sensor 23.

In the case of the mechanical oil pump 70 driven by the drive motor 40, if the drive motor 40 stops operating, the mechanical oil pump 70 also stops operating. Thus, if there is no accelerator operation by a rider, and if the transmission 80 is in the neutral state or the clutch 50 is in the disconnected state, the mechanical oil pump 70 also stops operating.

In the present embodiment, in contrast, if there is no accelerator operation by a rider, and if the transmission 80 is in the neutral state or the clutch 50 is in the disconnected state, the ECU 10 drives the drive motor 40 to operate the mechanical oil pump 70. The operation of the mechanical oil pump 70 supplies oil to the transmission 80 and the clutch 50. Thus, friction due to a lack of oil in the transmission 80 is alleviated, and thereby the durability of the transmission 80 and the clutch 50 can be improved.

Figure 4:
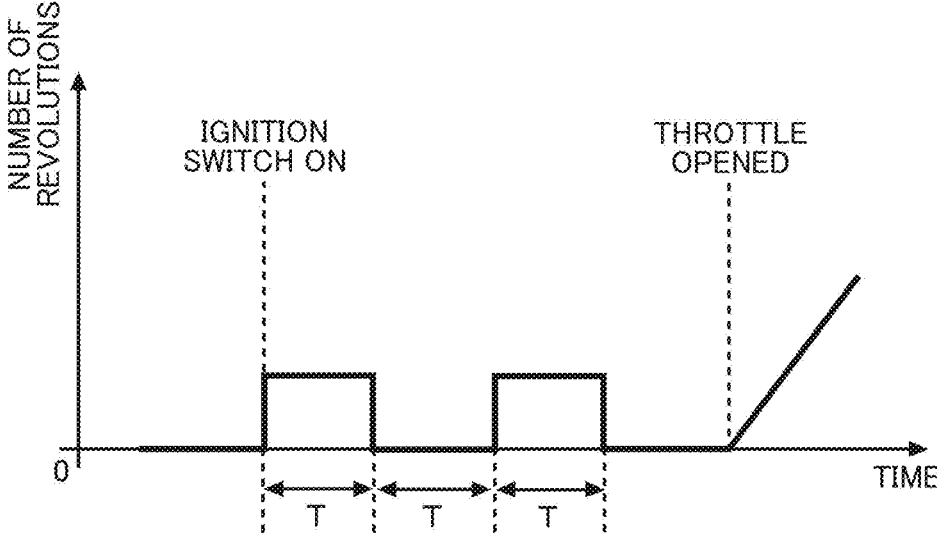
FIG. 4 is a diagram showing a relationship between the number of revolutions of a drive motor and elapsed time.

FIG. 4 is a diagram showing a relationship between the number of revolutions of the drive motor 40 and elapsed time.

The third drive condition is that the ignition switch 21 is turned ON.

When the ignition switch 21 being turned ON is detected, the ECU 10 performs ON/OFF control on the drive motor 40 until a throttle valve is opened by a rider's accelerator operation. That is, the ECU 10 performs control to drive the drive motor 40 for a predetermined set time T and then to stop the drive motor 40 for the set time T. For this control, the number of revolutions of the drive motor 40 may be equivalent to or less than a number of revolutions that maintains an idle state of the vehicle and may be, for example, a number of revolutions within a predetermined range, such as 1400 rpm to 2000 rpm. The timing to stop the ON/OFF control on the drive motor 40 may be when the gear position of the transmission 80 is operated to a state other than neutral or when the clutch 50 is brought into the connected state, in addition to when the throttle valve is brought into the opened state. Furthermore, the set time T in which the drive motor 40 is driven and the set time T in which the drive motor 40 is stopped may be the same or different.

There may be a lack of oil in the transmission 80 and the clutch 50 immediately after the ignition switch 21 is turned ON. In such cases, the ECU 10 drives the drive motor 40 to operate the mechanical oil pump 70 and thereby supplies oil to the transmission 80 and the clutch 50. In this way, a lack of oil in the transmission 80 and the clutch 50 can be inhibited, and thereby the durability of the transmission 80 and the clutch 50 can be improved.

The fourth drive condition is that the motorcycle 1 is stationary and the temperature of the drive motor 40 detected by the temperature sensor 41 is equal to or greater than a first set temperature.

For example, if the ECU 10 determines that the motorcycle 1 is stationary based on a sensor signal of the vehicle speed sensor 25 and the temperature of the drive motor 40 is equal to or greater than the first set temperature, the ECU 10 drives the drive motor 40. If, at this moment, the transmission 80 is not in the neutral state or the clutch 50 is not in the disconnected state, the ECU 10 causes the display portion 7 to display operation guidance. If the transmission 80 is not in the neutral state, the operation guidance instructs to bring the gear position of the transmission 80 into the neutral state. If the clutch 50 is not in the disconnected state, the operation guidance instructs to bring the clutch 50 into the disconnected state.

The ECU 10 drives the drive motor 40 until the temperature of the drive motor 40 decreases to be equal to or lower than a predetermined second set temperature. The second set temperature is a temperature lower than the first set temperature.

The ECU 10 drives the drive motor 40 also if the fourth drive condition is satisfied, and thereby supplies oil to the drive motor 40 and the transmission 80. In this way, the drive motor 40 is driven after the drive motor 40 is stopped by an operation of the rider, thereby causing the mechanical oil pump 70 to supply oil to the drive motor 40. The oil works as a coolant for cooling the drive motor 40. Cooling the drive motor 40 can improve the durability of the drive motor 40.

The fifth drive condition is that the ignition switch 21 is turned off.

The ECU 10 starts measuring time using a timer when the ignition switch 21 is turned off. The ECU 10 drives the drive motor 40 either until a predetermined set time is measured or until the temperature of the drive motor 40 measured by the temperature sensor 41 decreases to be equal to or lower than the predetermined second set temperature.

Thus, the temperature of the drive motor 40 can be lowered and thereby the durability of the drive motor 40 can be improved.

Figure 3:
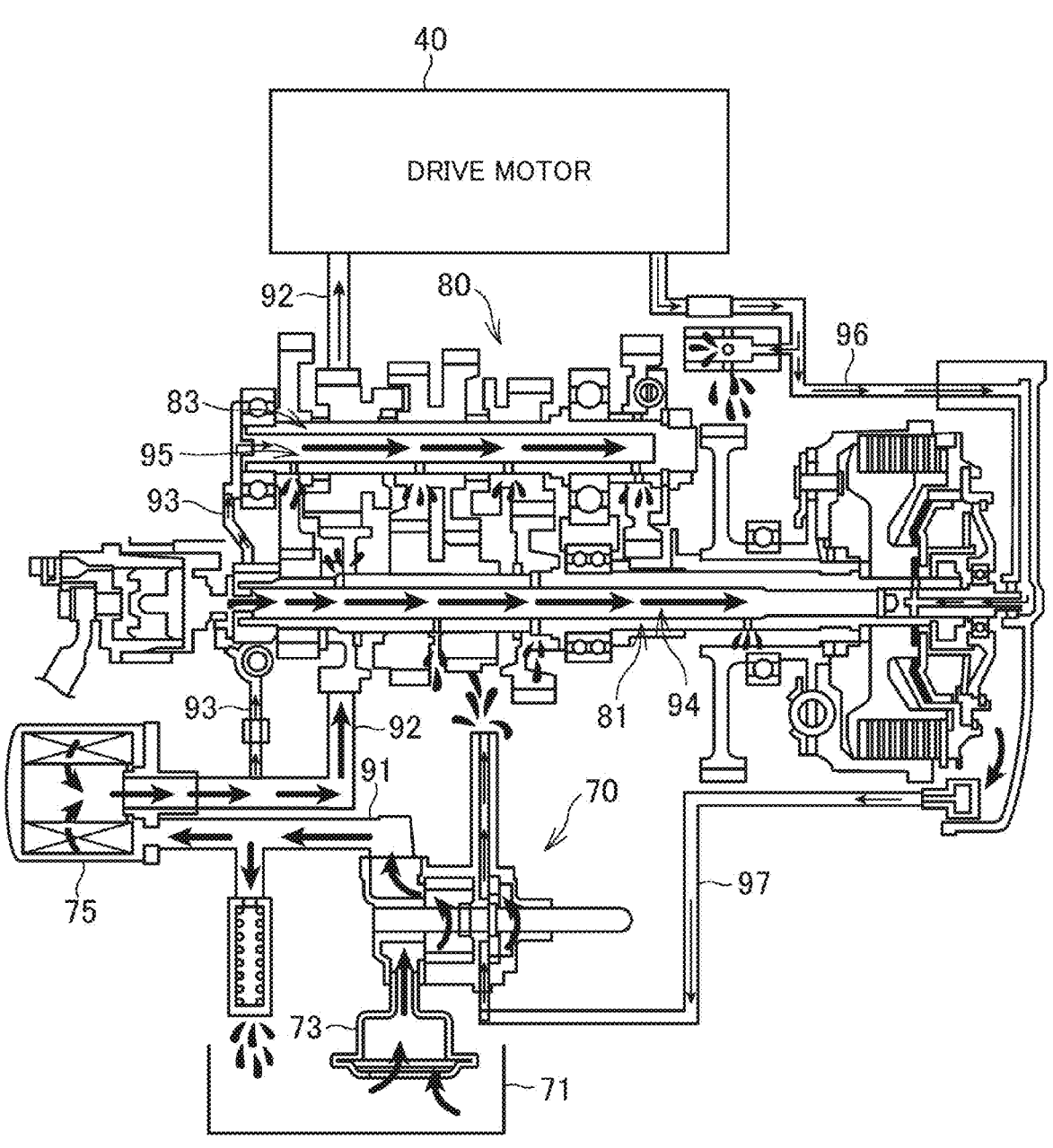
FIG. 3 is a diagram showing an oil supply path.

FIG. 3 is a diagram showing an oil supply path.

Referring to FIG. 3, the oil supply path is described below.

When the mechanical oil pump 70 is driven by the rotation of the driven sprocket 67, oil accumulates in an oil pan 71 is drawn. The drawn oil is transferred via an oil passageway 91 to an oil filter 75 where impurities are removed from oil by the oil filter 75.

The oil with impurities removed is transferred via an oil passageway 92 to the drive motor 40 where oil cools the drive motor 40. Having cooled the drive motor 40, oil is returned to the mechanical oil pump 70 via oil passageways 96 and 97.

Oil is also sent to a main shaft 81 and a countershaft 83 of the transmission 80 via an oil passageway 93. The main shaft 81 and the countershaft 83 have oil holes formed therein, and oil is discharged from the main shaft 81 and the countershaft 83 through the oil holes and supplied the oil to the gears and the like of the transmission 80. Some of the oil sent to the main shaft 81 is returned to the mechanical oil pump 70 via the oil passageway 97.

Figure 5:
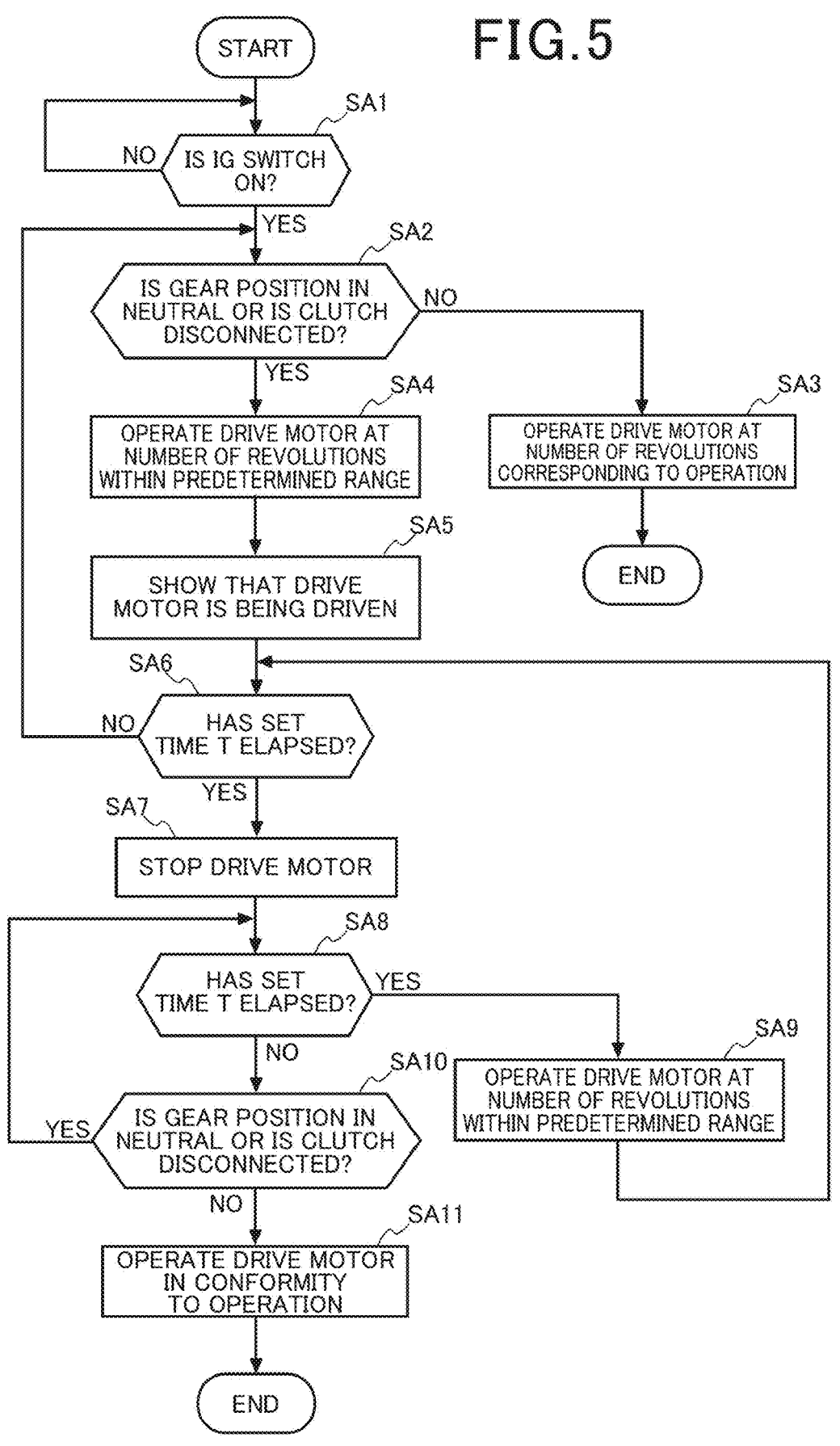
FIG. 5 is a flowchart showing an operation of an ECU performed when a third drive condition is satisfied.

FIG. 5 is a flowchart showing a first operation of the ECU 10.

Referring to the flowchart shown in FIG. 5, the first operation of the ECU 10 is described.

The first operation is an operation performed by the ECU 10 when the third drive condition is satisfied.

The ECU 10 determines whether the ignition switch 21 is turned ON (step SA1). If the ignition switch 21 is not turned ON (step SA1/NO), the ECU 10 waits until the ignition switch 21 is turned ON.

If the ignition switch 21 is turned ON (step SA1/YES), the ECU 10 determines whether the gear position of the transmission 80 is in neutral or the clutch 50 is in the disconnected state (step SA2). The ECU 10 determines whether the gear position of the transmission 80 is in neutral on the basis of a sensor signal of the neutral sensor 22. The ECU 10 determines whether the clutch 50 is in the disconnected state on the basis of a sensor signal of the clutch sensor 23.

If the gear position of the transmission 80 is not in neutral or the clutch 50 is in the connected state (step SA2/NO), the ECU 10 drives the drive motor 40 at a number of revolutions corresponding to an operation performed by the rider (step SA3) and finishes the processing flow.

If the gear position of the transmission 80 is in neutral or the clutch 50 is in the disconnected state (step SA2/YES), the ECU 10 operates the drive motor 40 at a number of revolutions within a predetermined range (step SA4). Subsequently, the ECU 10 causes the display portion 7 to show that the drive motor 40 is being driven (step SA5).

Subsequently, the ECU 10 determines whether the set time T has elapsed since the start of the drive motor 40 (step SA6). If the set time T has not elapsed (step SA6/NO), the ECU 10 reverts to determination in step SA2. If the set time T has elapsed (step SA6/YES), the ECU 10 stops driving the drive motor 40 (step SA7).

Subsequently, the ECU 10 again determines whether the set time T has elapsed since the stop of the drive motor 40 (step SA8).

If the set time T has elapsed (step SA8/YES), the ECU 10 operates the drive motor 40 at a number of revolutions within a predetermined range (step SA9). Subsequently, the ECU 10 reverts to determination in step SA6.

If the set time T has not elapsed (step SA8/NO), the ECU 10 determines whether the gear position of the transmission 80 is in neutral or the clutch 50 is in the disconnected state (step SA10). If the gear position of the transmission 80 is in neutral or the clutch 50 is in the disconnected state (step SA10/YES), the ECU 10 reverts to determination in step SA8 (step SA8). If the gear position of the transmission 80 is not in neutral or the clutch 50 is in the connected state (step SA10/NO), the ECU 10 drives the drive motor 40 at a number of revolutions in accordance with an accelerator operation performed by the rider (step SA11). Subsequently, the ECU 10 finishes the processing flow.

Figure 6:
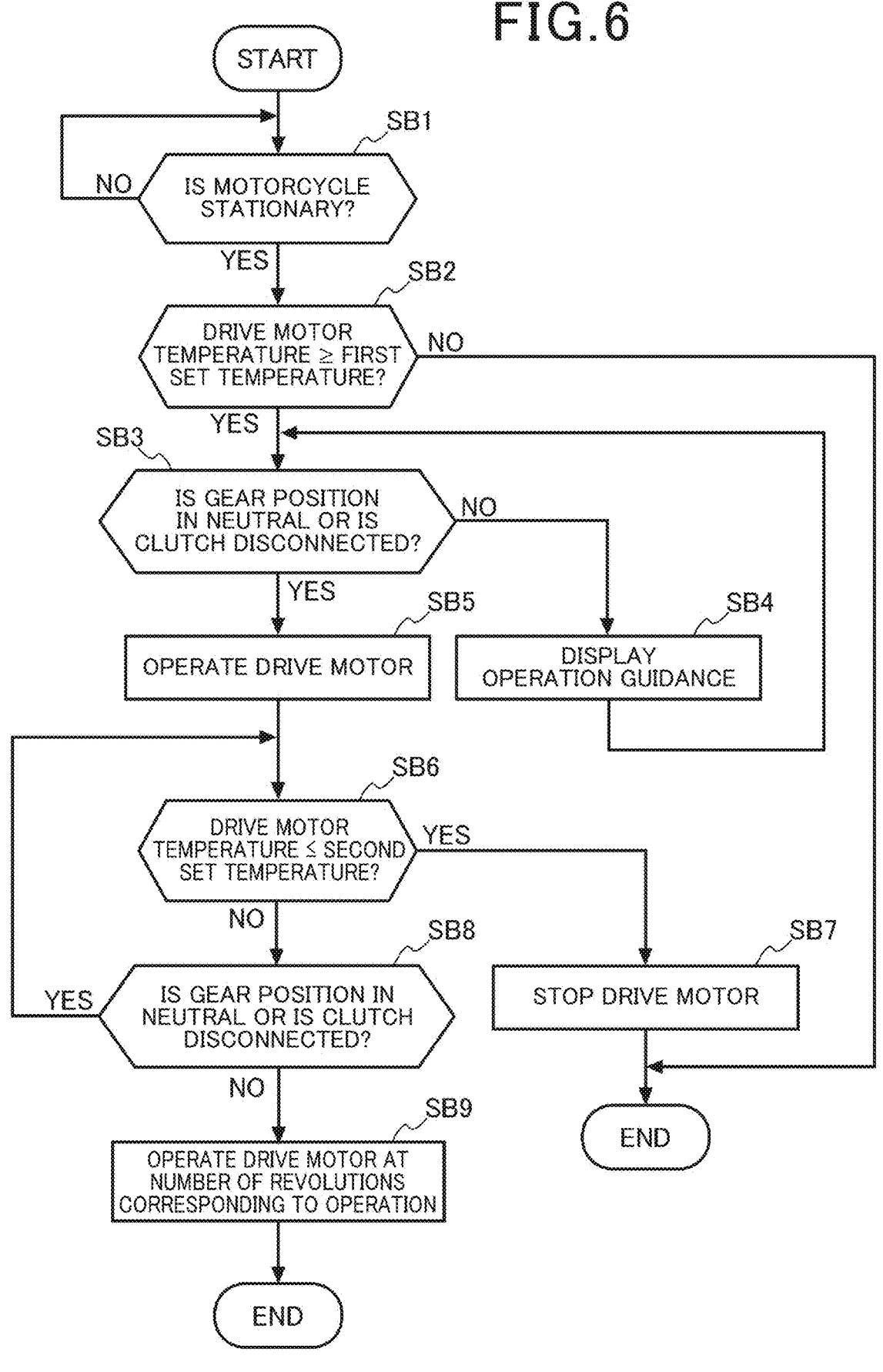
FIG. 6 is a flowchart showing an operation of the ECU performed when a fourth drive condition is satisfied.

FIG. 6 is a flowchart showing a second operation of the ECU 10.

Referring to the flowchart in FIG. 6, the second operation of the ECU 10 is described.

The second operation is an operation performed by the ECU 10 when the fourth drive condition is satisfied.

The ECU 10 determines whether the motorcycle 1 has stopped traveling (step SB1). The ECU 10 determines that the motorcycle 1 is stationary if the speed of the motorcycle 1 is 0 km/h on the basis of a sensor signal of the vehicle speed sensor 25 and an accelerator operation is not detected by the accelerator position sensor 24.

If the ECU 10 determines that the motorcycle 1 is not stationary (step SB1/NO), the ECU 10 waits to start the processing until it is determined that the motorcycle 1 is stationary.

If the ECU 10 determines that the motorcycle 1 is stationary (step SB1/YES), the ECU 10 obtains a temperature measured by the temperature sensor 41.

If the temperature of the drive motor 40 is lower than the predetermined first set temperature (step SB2/NO), the ECU 10 finishes the processing flow.

If the temperature of the drive motor 40 is equal to or greater than the first set temperature (step SB2), the ECU 10 determines whether the gear position of the transmission 80 is in neutral or the clutch 50 is in the disconnected state (step SB3).

If the gear position of the transmission 80 is not in neutral or the clutch 50 is in the connected state (step SB3/NO), the ECU 10 causes the display portion 7 to display operation guidance (step SB4). This operation guidance instructs to bring the gear position of the transmission 80 into neutral or bring the clutch 50 into the disconnected state. After the operation guidance is displayed on the display portion 7, the ECU 10 reverts to determination in step SB3.

If the gear position of the transmission 80 is in neutral or the clutch 50 is in the disconnected state (step SB3/YES), the ECU 10 drives the drive motor 40 (step SB5). Subsequently, the ECU 10 obtains a temperature measured by the temperature sensor 41. The ECU 10 determines whether the temperature of the drive motor 40 has decreased to be equal to or lower than the second set temperature (step SB6).

If the temperature of the drive motor 40 is greater than the second set temperature (step SB6/NO), the ECU 10 determines whether the gear position of the transmission 80 is in neutral or the clutch 50 is in the disconnected state (step SB8). If the gear position of the transmission 80 is not in neutral or the clutch 50 is in the connected state (step SB8/NO), the ECU 10 drives the drive motor 40 at a number of revolutions corresponding to an accelerator operation performed by the rider (step SB9) and finishes the processing flow.

If the gear position of the transmission 80 is in neutral or the clutch 50 is in the disconnected state (step SB8/YES), the ECU 10 reverts to determination in step SB6.

If the temperature of the drive motor 40 has decreased to be equal to or lower than the second set temperature (step SB6/YES), the ECU 10 stops driving the drive motor 40 (step SB7) and finishes the processing flow.

(Configurations Supported by the Embodiment Described Above)

The embodiment described above is an example of configurations described below.

(First configuration) A motorcycle including: a drive motor; a transmission; a clutch that connects or disconnects power transmission between the transmission and the drive motor; a mechanical oil pump that is driven by the drive motor to supply a coolant to the drive motor and the transmission; a first sensor that detects whether a gear position of the transmission is in a neutral state; a second sensor that detects a connect/disconnect state of the clutch; a third sensor that detects an accelerator operation; and a control portion that drives the drive motor to supply the coolant to the drive motor and the transmission if an accelerator operation is not detected by the third sensor and the neutral state is detected by the first sensor, or if an accelerator operation is not detected by the third sensor and a disconnected state of the clutch is detected by the second sensor.

In accordance with this configuration, a coolant can be supplied to the drive motor and the transmission by the mechanical oil pump driven by the drive motor if an accelerator operation is not detected and the neutral state is detected, or if an accelerator operation is not detected and the disconnected state of the clutch is detected.

Thus, a lack of oil can be inhibited in the drive motor and the transmission, and thereby the durability of the drive motor and the transmission can be improved.

(Second configuration) The motorcycle according to configuration 1, wherein, if an ignition switch is turned ON, the control portion drives the drive motor to supply the coolant to the drive motor and the transmission.

In accordance with this configuration, although a lack of oil is expected in the transmission and the gears of the transmission when the ignition switch is turned ON, a lack of oil in the transmission and the gears of the transmission can be prevented, and thereby the durability of the transmission and the gears of the transmission can be improved.

(Third configuration) The motorcycle according to configuration 2, including a notification portion, wherein, if the ignition switch is turned ON, the control portion causes the notification portion to make a notification of the driving of the drive motor.

In accordance with this configuration, a rider can be notified that the drive motor is operating, so that the rider can be inhibited from perceiving the drive motor operating as incongruous. Also, the rider can be made aware that the ignition switch is ON.

(Fourth configuration) The motorcycle according to configuration 1, where the motorcycle includes a fourth sensor that detects a temperature of the drive motor, wherein, if the motorcycle is stationary and the temperature of the drive motor detected by the fourth sensor is equal to or greater than a set temperature, the control portion drives the drive motor to supply the coolant to the drive motor and the transmission.

In accordance with this configuration, cooling of the drive motor can be continued even after the operation of the drive motor by an accelerator operation is stopped, and thereby the durability of the drive motor can be improved.

(Fifth configuration) The motorcycle according to configuration 4, wherein the motorcycle includes a notification portion, wherein, if the motorcycle is stationary, the temperature of the drive motor detected by the fourth sensor is equal to or greater than the set temperature, and the neutral state is not detected by the first sensor or the disconnected state of the clutch is not detected by the second sensor, the control portion causes the notification portion to make a notification of bringing the gear position of the transmission into the neutral state or a notification of bringing the clutch into the disconnected state.

In accordance with this configuration, the rider can be provided with guidance that instructs to bring the gear position of the transmission into the neutral state or to bring the clutch into the neutral state, so that the drive motor can be cooled, and thereby the durability of the drive motor can be improved.

(Sixth configuration) The motorcycle according to configuration 1, including a fourth sensor that detects a temperature of the drive motor, wherein, the control portion starts measuring a predetermined set time if an ignition switch is turned OFF, and drives the drive motor to supply the coolant to the drive motor and the transmission either until the temperature of the drive motor decreases to be equal to or lower than a set temperature or until the measuring of the set time is finished.

In accordance with this configuration, the mechanical oil pump can be cooled even after the ignition switch is turned OFF, and thereby the durability of the drive motor can be improved.

The embodiment described above illustrates an aspect of the present invention, and any modification or application is possible without departing from the spirit and scope of the present invention.

For example, while the display portion 7 is described as an example of the notification portion in the embodiment described above, a notification portion that notifies a rider by using sound may be used.

Furthermore, the flowcharts shown in FIGS. 5 and 6 have processing units that have been divided in accordance with main processing in order to facilitate understanding of the processing of the ECU 10, and the way processing units have been divided or their names do not limit the present disclosure. The processing of the ECU 10 can be divided into more processing units or divided such that one processing unit includes more processing, in accordance with the processing. Furthermore, the sequence of processing of the flowcharts shown in the above drawings is not limited.

REFERENCE SIGNS LIST

1 motorcycle
2 front wheel
3 rear wheel
5 operating system
6 primary driven gear
10 ECU
11 memory
13 processor
20 detection portion
21 ignition switch
22 neutral sensor
23 clutch sensor
24 accelerator position sensor
25 vehicle speed sensor
30 battery
40 drive motor
41 temperature sensor
50 clutch
63 drive sprocket

65 chain
67 driven sprocket
70 mechanical oil pump
71 oil pan
75 oil filter
80 transmission
81 main shaft
83 countershaft
91, 92, 93, 94, 95, 96, 97 oil passageway

The invention claimed is:

1. A motorcycle comprising:

a drive motor;

a transmission;

a mechanical oil pump that is driven by the drive motor to supply a coolant to the drive motor and the transmission;

a notification portion; and a control portion that drives the drive motor to supply the coolant to the drive motor and the transmission if an ignition switch is turned ON, wherein, if the ignition switch is turned ON, the control portion causes the notification portion to make a notification of the driving of the drive motor.

\* \* \* \* \*